Aug. 26, 1969  R. C. MOTT  3,463,389

FLUID ACTUATED LOGIC DEVICE

Filed Nov. 21, 1967

INVENTOR.
RICHARD C. MOTT
BY
Osmund A Dahle
ATTORNEY.

United States Patent Office 3,463,389
Patented Aug. 26, 1969

3,463,389
FLUID ACTUATED LOGIC DEVICE
Richard C. Mott, Harwood Heights, Ill., assignor to Honeywell Inc., Minneapolis, Minn., a corporation of Delaware
Filed Nov. 21, 1967, Ser. No. 684,655
Int. Cl. G06m 1/12; G05d 11/02
U.S. Cl. 235—201
7 Claims

ABSTRACT OF THE DISCLOSURE

A pneumatic ball-type logic device that performs a bistable function in response to a series of fluid pressure pulses. The ball is disposed in a chamber consisting of two intersecting passages and causes the output pressure to be switched in accordance with its movement from one passage to the other.

Background of the invention

The bistable function is presently performed by various fluid actuated devices that employ ball-type members for switching purposes. Generally, prior art devices require a separate supply pressure that is controlled by signal pressures acting on the ball member. A disadvantage of this is inability of the device to retain its power of memory in the event of supply pressure failure. In some instances a plurality of devices wtih concomitant circuitry is necessary to achieve bistable operation, and in other cases two or more ball members are needed in a single device to achieve the desired switching. Furthermore, nearly all devices exact a minimum of precision with respect to the ball members, associated passages and valve seats. The present invention overcomes these difficulties and offers further advantages as outlined below.

Summary of the invention

The inventive concept resides in the use of a ball member in a pressure chamber having a pair of inlets and a pair of associated outlets. The two inlets are commonly connected to a source of fluid pressure pulses, and a biasing force is employed to retain the ball at either of the two inlets in the absence of other forces. The outlets are positioned with respect to the inlets such that a pressure pulse causes the ball to move from one of the inlets to its associated outlet, whereupon removal of the pulse causes the ball to be conveyed to the opposite inlet by virtue of the biasing force. A second pressure pulse causes the ball to move to the second outlet, and removal of the pulse allows the biasing force to return the ball to the first inlet, thereby completing the cycle.

In the preferred embodiment, the chamber is formed by two intersecting passages the ends of which serve as inlets and outlets. The passages are disposed in an upright manner and gravity is used as the biasing force.

As the ball responds to the pressure pulse and comes into contact with an outlet, that outlet is sealed and output pressure escapes from the open outlet. Since only a minimum pressure is required to move the ball to an outlet position and the maximum usable pressure is limited only by the pressure capacity of the device, it is evident that proper operation is possible over a wide range of pulse pressures. This freedom of pulse pressure magnitude allows many units to be cascaded since each device undergoes a pressure drop that precludes the transmitttnce of equal pressure pulses to subsequent devices. Because of this cascading capability, the device is ideally suited for counting and sequential action applications.

It is further apparent from opeartion of the device that a loss of pressure will not result in a loss of memory, since the ball sequentially proceeds to the next inlet in absence of a pressure pulse. Hence, the ball position can be determined even in the event of a pressure failure.

Description of the preferred embodiments

Figure 1:
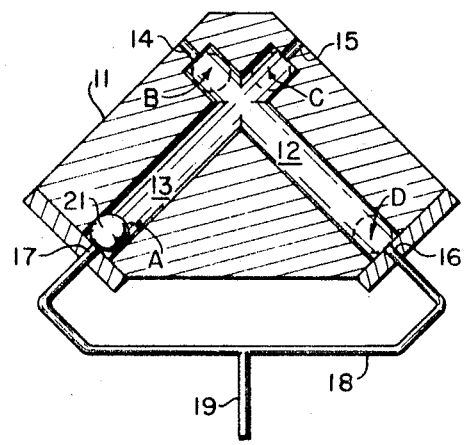
FIGURE 1 discloses a fluid actuated logic device that employs a ball member freely movable within two intersecting passage to perform a bistable switching function.

In FIGURE 1, a body 11 encloses a chamber consisting of passages 12, 13 that intersect as shown. The upper ends of passages 12, 13 are provided with outlets 14, 15, respectively, and the lower ends are similarly provided with inlets 16, 17. Inlets 16, 17 are connected by a tube 18 having an inlet 19, which is adapted for connection with a source of fluid pressure pulses, not shown. Disposed within the confines of passages 12, 13 is a ball 21 which is freely movable therein and serves as a closure member to the outlets 14, 15. The letters A, B, C, and D indicate the positions which the ball 21 can assume during operation of the device.

For purposes of convenience, it is initially assumed that ball 21 is in position A as operation begins. A fluid pressure pulse is supplied at inlet 19 and in response thereto, ball 21 moves from position A to position C where it is held by means of the pressure drop across outlet 15. Ball 21 thus seals outlet 15 and the presure pulse is allowed to escape throughe outlet 14. Upon removal of the pulse, ball 21 falls from position C to position D due to gravity. A second fluid pressure pulse at inlet 19 causes the ball to move from position D to position B where it seals outlet 14 and allows a pressure pulse to be emitted from outlet 15. Removal of the second pressure pulse allows the ball 21 to fall from position B to position A, and the cycle is completed.

Figure 2:
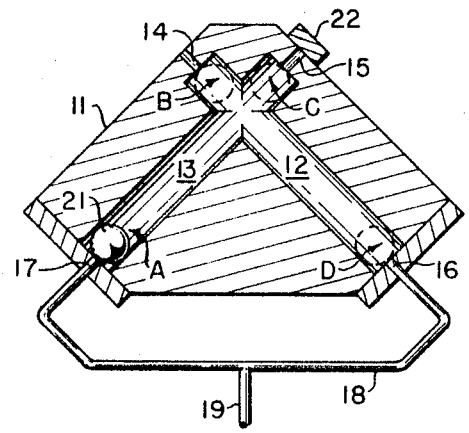
FIGURE 2 discloses a fluid actuated logic device with a resetting means.

In FIGURE 2, output 15 is provided with a block 22 for resetting purposes. If it is assumed that ball 21 initially rests in position A, a pressure pulse entering inlet 19 will cause ball 21 to move from position A directly to position B by reason of the pressure established at blocked outlet 15. Upon removal of the pressure pulse, the ball falls from position B to reset position A.

If ball 21 initially rests in position D while block 22 covers outlet 15, a pressure pulse entering at inlet 19 will move ball 21 from poition D to position B, and it will return to reset position A upon removal of the pulses. If position D is the preferred reset position, it will be appreciated that outlet 14 instead of outlet 15 can be closed by block 22.

Figure 3:
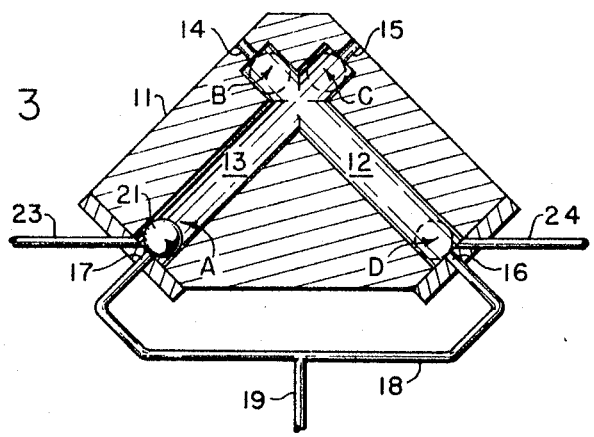
FIGURE 3 discloses a fluid actuated logic device with an alternative resetting means.

In FIGURE 3, the logic device includes additional inlets 23, 24 at the lower ends of passages 12, 13 to provide a set-reset function. A pulse at inlet 23 causes ball 21 to move to set position D, and a pulse at inlet 24 effects movement of the ball 21 to reset position A.

The embodiments of the invention in which an exclusive property or right is claimed are defined as follows:
1. A fluid actuated logic device comprising:
a hollow body provided with a chamber therein;
a closure member disposed in the chamber and movable therein;
the chamber having first, second, third and fourth sequential positions for the closure member, the closure member normally being retained in one of the first and third positions by a biasing force;
first and second chamber inlets connected with the chamber at the first and third positions, respectively;
first and second chamber outlets connected with the chamber at the second and fourth positions, respectively, the closure member adapted to seal the first and second chamber outlets upon engagement therewith;

means connecting the first and second chamber inlets and adapted for connection with a source of fluid pressure pulses;

the closure member positions arranged within the chamber so that the closure member is movable from the first and third positions to the second and fourth positions, respectively, in response to fluid pressure pulses, and movable in the absence of fluid pressure pulses from the second and fourth positions to the third and first positions, respectively, in response to the biasing force.

2. The fluid actuated logic device as defined by claim 1, wherein the chamber comprises first and second intersecting passages each of which has a first end and a second end, the first ends of the first and second passages defining the first and third closure member positions, respectively, and the second ends of the first and second passages defining the second and fourth closure member positions, respectively.

3. The fluid actuated logic device as defined by claim 2, wherein the first and second passages are round in cross section, and the closure member is spherical in shape.

4. The fluid actuated logic device as defined by claim 1, wherein the second and fourth closure member positions are disposed above the first and third closure member positions, and gravity serves as the biasing force.

5. The fluid actuated logic device as defined by claim 1, further comprising reset means for effecting placement of the closure member in a single predetermined position regardless of the previous closure member position.

6. The fluid actuated logic device as defined by claim 5, wherein the reset means comprises means for blocking one of the chamber outlets.

7. The fluid actuated logic device as defined by claim 5, wherein the reset means comprises a third chamber inlet connected with the chamber at one of the first and third positions.

References Cited
UNITED STATES PATENTS

| 3,168,898 | 2/1965 | Samet | 137—119 |
|---|---|---|---|
| 3,151,623 | 10/1964 | Riordan | 137—118 XR |

WILLIAM F. O'DEA, Primary Examiner

WILLIAM H. WRIGHT, Assistant Examiner

U.S. Cl. X.R.

137—81.5, 118, 119